(12) United States Patent
Ideno

(10) Patent No.: US 7,938,753 B2
(45) Date of Patent: May 10, 2011

(54) TRAINING APPARATUS AND TRAINING METHOD

(75) Inventor: Kouichi Ideno, Tokyo (JP)

(73) Assignee: Sony Corporation (JP)

( * ) Notice: Subject to any disclaimer, the term of this patent is extended or adjusted under 35 U.S.C. 154(b) by 45 days.

(21) Appl. No.: 12/455,358

(22) Filed: Jun. 1, 2009

(65) Prior Publication Data

US 2009/0312153 A1 Dec. 17, 2009

(30) Foreign Application Priority Data

Jun. 9, 2008 (JP) ................. P2008-150641

(51) Int. Cl.
*A63B 71/00* (2006.01)
(52) U.S. Cl. .................. 482/9; 482/1; 482/901
(58) Field of Classification Search .......... 482/1–9, 482/900–902; 434/247, 258
See application file for complete search history.

(56) References Cited

U.S. PATENT DOCUMENTS

| | | | | |
|---|---|---|---|---|
| 5,584,779 A | * | 12/1996 | Knecht et al. | 482/8 |
| 5,597,309 A | * | 1/1997 | Riess | 434/258 |
| 6,410,835 B2 | * | 6/2002 | Suzuki et al. | 84/464 R |
| 7,060,000 B2 | * | 6/2006 | Carlson | 482/1 |

FOREIGN PATENT DOCUMENTS

| | | |
|---|---|---|
| JP | 06059846 A | 3/1994 |
| JP | 2002-182813 A | 6/2002 |
| JP | 2006-139163 A | 6/2006 |
| JP | 2007288266 A | 11/2007 |

OTHER PUBLICATIONS

Office Action from Japanese Application No. 2008-150641, dated Jul. 13, 2010.

* cited by examiner

*Primary Examiner* — Glenn Richman
(74) *Attorney, Agent, or Firm* — Lerner, David, Littenberg, Krumholz & Mentlik, LLP

(57) ABSTRACT

A training apparatus includes: a storing means for storing therein targeted goal command information indicating correct input order of commands necessary to perform a targeted operation for each of individual targeted operations; and a control means, wherein the control means conducts a targeted operation selecting process of selecting one targeted operation from the individual targeted operations based on a user manipulation; a user input command information generation process of generating user input command information by accumulating a command inputted based on a user manipulation; and a notification control process of conducting control so as to notify a compared result of the targeted goal command information about a targeted operation selected in the targeted operation selecting process with user input command information generated in the user input command information generation process.

7 Claims, 12 Drawing Sheets

FIG.4

CASE OF "SPECIFY DATE AND TIME TO PRESELECT RECORDING"

TARGETED GOAL COMMAND INFORMATION (a)
"PRESELECT DATE AND TIME" BUTTON SPECIFYING COMMAND
"SET DATE AND TIME" BUTTON SPECIFYING COMMAND
"CONFIRM PRESELECT" BUTTON SPECIFYING COMMAND

TRAINING END COMMAND (b) "CONFIRM PRESELECT" BUTTON SPECIFYING COMMAND

USER INPUT COMMAND INFORMATION (c)
"PRESELECT DATE AND TIME" BUTTON SPECIFYING COMMAND
"SET BD AS RECORDING DESTINATION" BUTTON SPECIFYING COMMAND
"CONFIRM PRESELECT" BUTTON SPECIFYING COMMAND

FIG.5

CASE OF "PRESELECT RECORDING ACCORDING TO A PROGRAM GUIDE"

TARGETED GOAL COMMAND INFORMATION (a) "DISPLAY PROGRAM GUIDE" BUTTON SPECIFYING COMMAND
BROADCAST PROGRAM IN PROGRAM GUIDE SPECIFYING COMMAND
"CONFIRM PRESELECT" BUTTON SPECIFYING COMMAND

TRAINING END COMMAND (b) "CONFIRM PRESELECT" BUTTON SPECIFYING COMMAND

USER INPUT COMMAND INFORMATION (c) "DISPLAY PROGRAM GUIDE" BUTTON SPECIFYING COMMAND
BROADCAST PROGRAM IN PROGRAM GUIDE SPECIFYING COMMAND
"CONFIRM PRESELECT" BUTTON SPECIFYING COMMAND

FIG.6
CASE OF "ERASE A CHAPTER"

TARGETED GOAL COMMAND INFORMATION (a)
```
RECORDED VIDEO TITLE SPECIFYING COMMAND
"OPTION" BUTTON SPECIFYING COMMAND
"EDIT" BUTTON SPECIFYING COMMAND
"ERASE CHAPTER" BUTTON SPECIFYING COMMAND
CHAPTER TO ERASE SPECIFYING COMMAND
"CONFIRM" BUTTON SPECIFYING COMMAND
"YES" BUTTON SPECIFYING COMMAND
```

TRAINING END COMMAND (b) "YES" BUTTON SPECIFYING COMMAND

USER INPUT COMMAND INFORMATION (c)
```
RECORDED VIDEO TITLE SPECIFYING COMMAND
"OPTION" BUTTON SPECIFYING COMMAND
"EDIT" BUTTON SPECIFYING COMMAND
"ERASE CHAPTER" BUTTON SPECIFYING COMMAND
CHAPTER TO ERASE SPECIFYING COMMAND
"CONFIRM" BUTTON SPECIFYING COMMAND
"YES" BUTTON SPECIFYING COMMAND
```

FIG.7

CASE OF "EXTRACT A THUMBNAIL"

TARGETED GOAL COMMAND INFORMATION (a)
```
RECORDED VIDEO TITLE SPECIFYING COMMAND
"OPTION" BUTTON SPECIFYING COMMAND
"EDIT" BUTTON SPECIFYING COMMAND
"SET THUMBNAIL" BUTTON SPECIFYING COMMAND
"FAST FORWARD" OR "REWIND" COMMAND
"CONFIRM" BUTTON SPECIFYING COMMAND
```

TRAINING END COMMAND (b) "CONFIRM" BUTTON SPECIFYING COMMAND

USER INPUT COMMAND INFORMATION (c)
```
RECORDED VIDEO TITLE SPECIFYING COMMAND
"OPTION" BUTTON SPECIFYING COMMAND
"EDIT" BUTTON SPECIFYING COMMAND
"SET THUMBNAIL" BUTTON SPECIFYING COMMAND
"CONFIRM" BUTTON SPECIFYING COMMAND
```

FIG.8

CASE OF "REPRODUCE A DVD/BD"

TARGETED GOAL COMMAND INFORMATION (a) | "REPRODUCE DVD/BD" BUTTON SPECIFYING COMMAND |

TRAINING END COMMAND (b) | "REPRODUCE DVD/BD" BUTTON SPECIFYING COMMAND |

USER INPUT COMMAND INFORMATION (c) | "REPRODUCE DVD/BD" BUTTON SPECIFYING COMMAND |

FIG.9

CASE OF "REPRODUCE RECORDED VIDEO"

TARGETED GOAL COMMAND INFORMATION (a) | "REPRODUCE RECORDED VIDEO" BUTTON SPECIFYING COMMAND

TRAINING END COMMAND (b) | "REPRODUCE RECORDED VIDEO" BUTTON SPECIFYING COMMAND

USER INPUT COMMAND INFORMATION (c) | "REPRODUCE RECORDED VIDEO" BUTTON SPECIFYING COMMAND

TRAINING APPARATUS AND TRAINING METHOD

The present application claims priority from Japanese Patent Application No. JP 2008-150641 filed in the Japanese Patent Office on Jun. 9, 2008, the entire content of which is incorporated herein by reference.

BACKGROUND OF THE INVENTION

1. Field of the Invention

The present invention relates to a training apparatus that allows a user to train him/herself to manipulate an appliance and a method of the same.

2. Description of the Related Art

Heretofore, a video recording and reproducing apparatus that stores video contents such as TV broadcast programs and reproduces stored video contents is widely available. The video recording and reproducing apparatus becomes sophisticated more and more with the recent progress of computer technology. In addition to the functions of storing and reproducing TV broadcast programs, appliances with a wide variety of functions including a function of editing video contents are widespread (see patent documents, JP-A-2002-182813 and JP-A-2006-139163).

SUMMARY OF THE INVENTION

As described above, because the video recording and reproducing apparatus has a wide variety of functions, a user can enjoy video contents much more.

However, on the other hand, as the video recording and reproducing apparatus becomes a multi-functional apparatus, a user has to learn complicated manipulations to master these functions. In other words, recent home-use AV appliances including the video recording and reproducing apparatus tend to put extra burdens on a user to learn complicated manipulations, and it is desired to improve this point.

In consideration of the problem above, it is desirable to provide and configure a training apparatus as below.

That is, a training apparatus according to an embodiment of the invention has a storing means for storing therein targeted goal command information indicating correct input order of commands necessary to perform a targeted operation for each of individual targeted operations, and a control means.

Then, the control means conducts a targeted operation selecting process of selecting one targeted operation from the individual targeted operations based on a user manipulation; a user input command information generation process of generating user input command information by accumulating a command inputted based on a user manipulation; and a notification control process of conducting control so as to notify a compared result of the targeted goal command information about a targeted operation selected in the targeted operation selecting process with user input command information generated in the user input command information generation process.

According to the configuration, it is possible to notify a user of the compared result of information about a command actually inputted by the user with information about a correct command to perform the targeted operation. In other words, by this scheme, it is made possible to conduct manipulation training to teach the steps of correct manipulations to the user to perform the targeted operation.

According to the embodiment of the invention, as described above, the user is notified of the compared result of information about a command actually inputted by the user with information about the correct command to perform the targeted operation, whereby manipulation training can be conducted to teach the steps of correct manipulations to the user to perform the targeted operation.

Through such manipulation training, the user can readily learn the steps of correct manipulations for performing the targeted operation without reading a manual. In other words, on this point, even though the user has to learn complicated manipulations, the burdens of the user can be reduced significantly.

In addition, according to the embodiment of the invention, the user is allowed to do manipulation training not only for a single targeted operation but also for a plurality of targeted operations.

BRIEF DESCRIPTION OF THE DRAWINGS

FIG. 4 is a diagram illustrative of a specific example of a manipulation training operation of an embodiment;

FIG. 5 is a diagram illustrative of a specific example of a manipulation training operation of an embodiment;

FIG. 6 is a diagram illustrative of a specific example of a manipulation training operation of an embodiment;

FIG. 7 is a diagram illustrative of a specific example of a manipulation training operation of an embodiment;

FIG. 8 is a diagram illustrative of a specific example of a manipulation training operation of an embodiment;

FIG. 9 is a diagram illustrative of a specific example of a manipulation training operation of an embodiment;

DESCRIPTION OF THE PREFERRED EMBODIMENT

Figure 1:
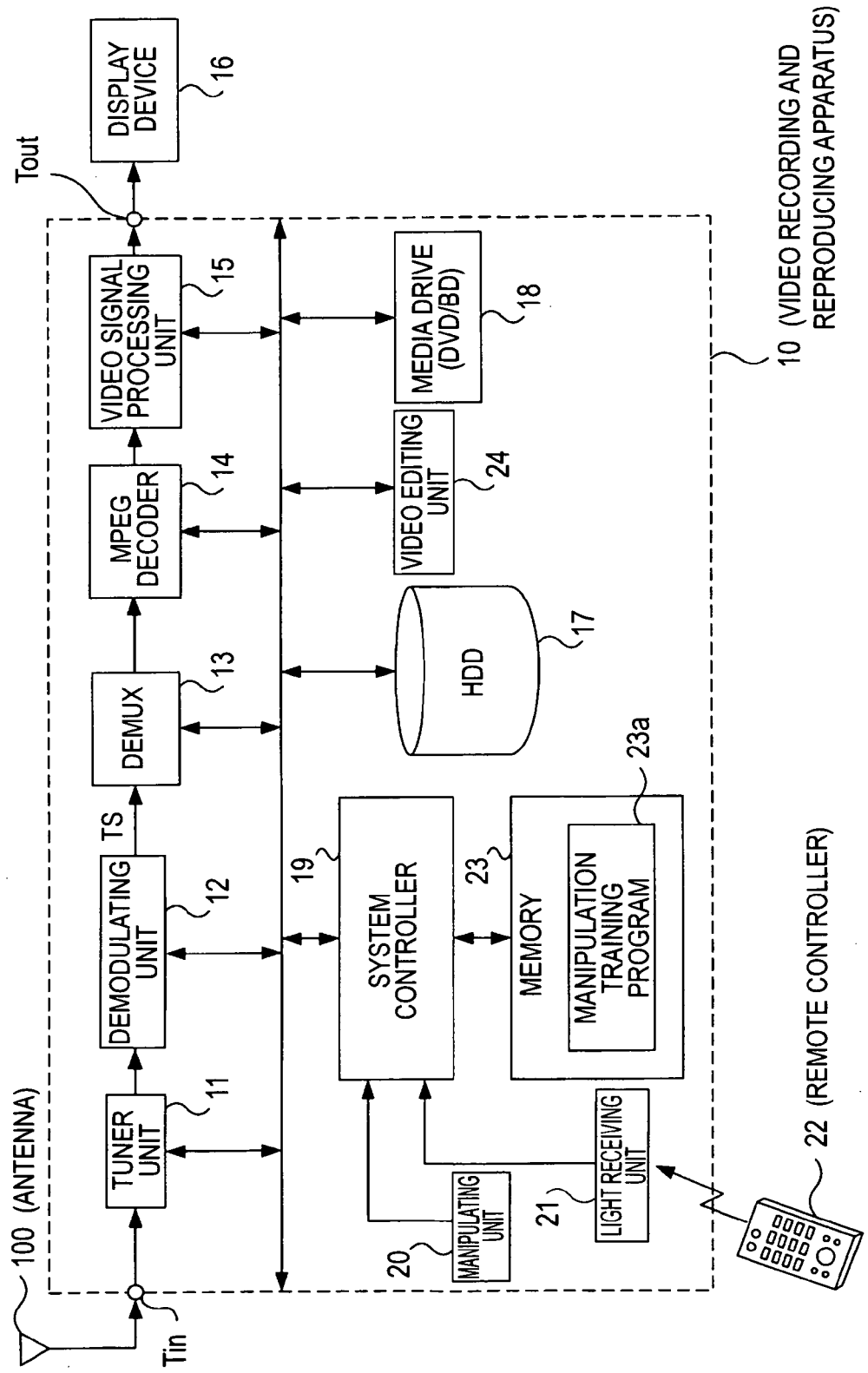
FIG. 1 is a block diagram depicting the internal configuration of a training apparatus according to an embodiment of the invention.

Hereinafter, a preferred embodiment of the invention will be described (hereinafter, referred to as an embodiment).
Configuration of a Training Apparatus FIG. 1 is a block diagram depicting the internal configuration of a video recording and reproducing apparatus 10 as an exemplary embodiment of a training apparatus according to an embodiment of the invention.

As shown in the drawing, the video recording and reproducing apparatus 10 has an input terminal Tin, a tuner unit 11, a demodulating unit 12, a demultiplexer (DEMUX) 13, an MPEG decoder 14, a video signal processing unit 15, a video output terminal Tout, a HDD (Hard Disc Drive) 17, a media drive 18, a system controller 19, a manipulating unit 20, a light receiving unit 21, a memory 23, and a video editing unit 24.

For example, the video recording and reproducing apparatus 10 is configured to be able to receive digital television (TV) broadcasting such as terrestrial digital broadcasts. In addition, entries can be made to the video recording and reproducing apparatus 10 with an included remote controller 22.

In addition, although the embodiment of the invention relates to manipulation training for a user, in the embodiment, manipulation training is conducted by using the screen of an external display device 16 to the video recording and reproducing apparatus 10. From this viewpoint, the configuration of a sound output system in the video recording and reproducing apparatus 10 is not important in particular, and the illustration of the same is omitted. The configuration of the sound output system of the video recording and reproducing apparatus 10 may be suitably and properly selected depending on an actual form.

In FIG. 1, digital TV broadcast signals are inputted from an external antenna 100 to the video recording and reproducing apparatus 10 through the input terminal Tin.

Then, the TV broadcast signals inputted through the input terminal Tin are inputted to the tuner unit 11.

The tuner unit 11 receives a carrier in accordance with tuning information from the system controller 19, described later.

For the carrier received by the tuner unit 11, the demodulating unit 12 conducts a predetermined demodulation process in accordance with the type of the received broadcast waves, the demodulation process of OFDM (Orthogonal Frequency Division Multiplexing), for example, when the broadcast is a terrestrial digital broadcast, whereby a transport stream (TS) is obtained, which includes a broadcast content (broadcast program) of a broadcast station instructed to select.

As the TS packets of a targeted single broadcast program (a broadcast program broadcast by the broadcast station instructed to select), the demultiplexer (DEMUX) 13 obtains the TS packets of video data and the TS packets of audio data compressed according to MPEG-2 (Moving Pictures Experts Group-2) from the TS obtained in the demodulating unit 12.

Then, the TS packets of video data and audio data obtained in the demultiplexer 13 are decoded (decompressed) by the MPEG decoder 14, and the decoded video data is subjected to a necessary video signal process in the video signal processing unit 15, and then supplied to the external display device 16 through the video output terminal Tout.

The display device 16 has a display panel unit 16a such as a liquid crystal panel or a plasma display panel (omitted in FIG. 1), and a display drive unit that drives the display panel unit 16a for display, and the display device 16 displays video based on video data supplied through the video output terminal Tout as described above.

In addition, the TS packets obtained by the demultiplexer 13 are supplied to the HDD 17, or to the media drive 18 under the control of the system controller 19, described later, and recorded as an MPEG-2 file.

More specifically, in response to an instruction made to the HDD 17 to record data by a manipulated input from the remote controller 22 (or the manipulating unit 20), the system controller 19 conducts control such that the TS packets (a broadcast content) obtained in the demultiplexer 13 are supplied to the HDD 17 and recorded as an MPEG-2 file. In addition, when the media drive 18 is instructed to record data, the system controller 19 conducts control such that the TS packets obtained in the demultiplexer 13 are supplied to the media drive 18 and recorded as an MPEG-2 file on a recording medium installed in the media drive 18.

In the case of this example, as the media drive 18, it is configured to record and/or reproduce a content on a DVD (Digital Versatile Disc) or a BD (Blu-ray Disc: registered trademark).

In addition, when a user makes a manipulation to input an instruction to reproduce an MPEG-2 file recorded on the HDD 17, a DVD, or a BD, under the control of the system controller 19, the MPEG-2 file is read out of the HDD 17 or the recording medium inside the media drive 18, and the read MPEG-2 file is supplied to the MPEG decoder 14.

The video signal processing unit 15 is configured to apply a necessary video signal process to video data supplied from the MPEG decoder 14 as described above and supply the video data to the video output terminal Tout. Thus, in accordance with the reproduction manipulation, video based on the MPEG-2 file instructed to reproduce is displayed on the external display device 16.

In addition, in this case, the video signal processing unit 15 also conducts a process of displaying various items of information on the screen of the display device 16. More specifically, in response to the instruction from the system controller 19, the video signal processing unit 15 creates video data in order to display the supplied data for display on the screen of the display device 16 in a predetermined layout, and supplies the video data to the video output terminal Tout.

Based on the instruction from the system controller 19, the video editing unit 24 conducts various video edit processes for the MPEG-2 file read out of the HDD 17 or the recording medium inside the media drive 18, for example. For instance, for the video edit process conducted in the video editing unit 24, the following editing can be named: cutting video in a predetermined section such as cutting commercials, and adding and deleting chapters.

In addition, here, although such a configuration is taken as an example that the video edit process is conducted by hardware as the video editing unit 24, the video edit process may be conducted by a software process by means of the system controller 19, for example.

The system controller 19 is configured of a microcomputer having a CPU (Central Processing Unit), a ROM (Read only Memory), and a RAM (Random Access Memory), and conducts a computation process and a control process based on an activated program for controlling the overall video recording and reproducing apparatus 10.

As shown in the drawing, the manipulating unit 20 is connected to the system controller 19. The manipulating unit 20 is provided with various controls, not shown, arranged on a cabinet of the video recording and reproducing apparatus 10 such that the controls are arranged outside the cabinet. The manipulating unit 20 supplies information about the manipulated input of each of these controls to the system controller 19.

In addition, the light receiving unit 21 is connected to the system controller 19. The light receiving unit 21, for example, has a light receiving device for infrared signals such as a phototransistor, and optically receives infrared signals sent from the remote controller 22 in the drawing. Based on the optical signals received in the light receiving unit 21, the system controller 19 acquires manipulated input information from the remote controller 22.

The system controller 19 conducts the computation process and the control processes of the individual units based on manipulated input information from the manipulating unit 20, or on manipulated input information acquired through the light receiving unit 21. Thus, it is configured to perform operations in accordance with the user instruction in the video recording and reproducing apparatus 10.

In addition, the memory 23 is connected to the system controller 19. The memory 23 is a non-volatile memory such as a flash memory, and used to store various items of data therein.

In addition, in the memory 23, a manipulation training program 23a is stored. The manipulation training program 23a is a program that allows the system controller 19 to conduct the operations of processes to be performed for implementing the operations as an exemplary embodiment of manipulation training described below.

Manipulation Training

In the video recording and reproducing apparatus 10 having the configuration described above, operations are performed to allow a user to do manipulation training. Hereinafter, the operations as an exemplary embodiment conducted by the video recording and reproducing apparatus 10 for manipulation training will be described.

In addition, in the descriptions below, the steps of manipulations performed by the user for doing manipulation training will be also described.

First, when manipulation training is performed, it is necessary for the user to switch the mode of the video recording and reproducing apparatus 10 to a manipulation training mode. In this case, switching the mode to the manipulation training mode is conducted by specifying a function item "manipulation training" on the screen.

More specifically, the video recording and reproducing apparatus 10 in this case is configured to be able to display a function menu screen to present to the user various functional operations operable by the apparatus itself. Then, as one of the function items on the function menu screen, it is configured to display the function item "manipulation training".

In the display state of the function menu screen, the user makes a manipulation to select and determine the item "manipulation training", whereby the user can make an instruction to the video recording and reproducing apparatus 10 to start the operation for manipulation training. In other words, the user can direct switching the mode to the manipulation training mode by this instruction.

Figure 2:
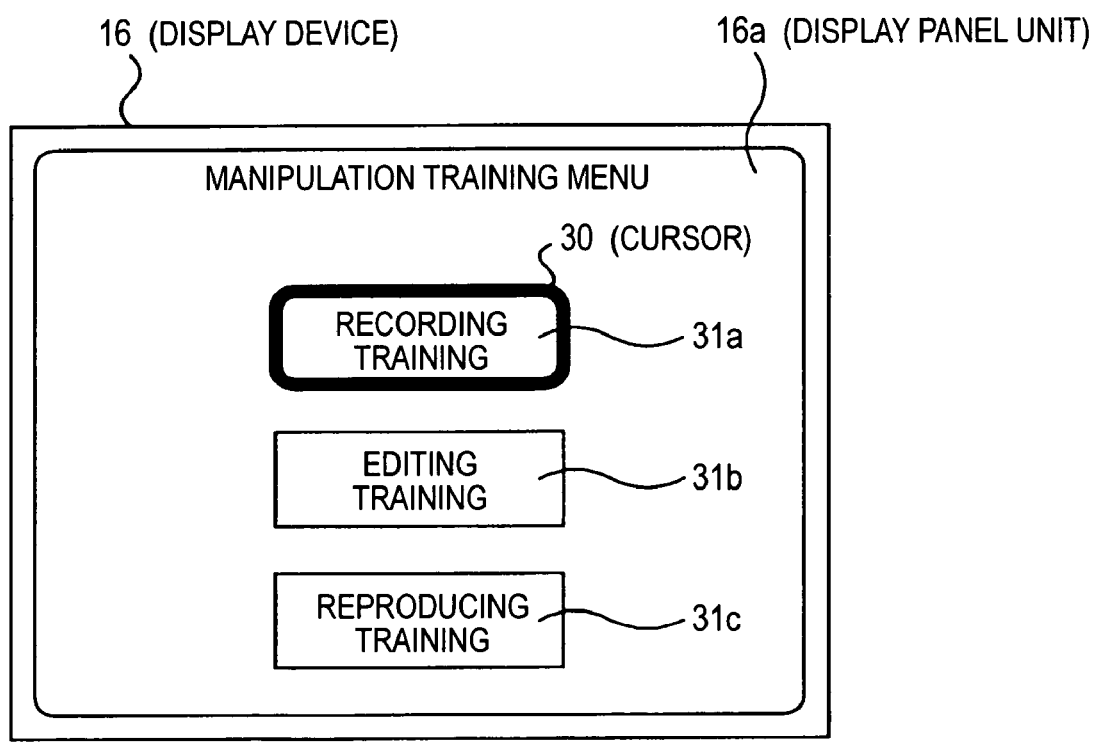
FIG. 2 is a diagram depicting an exemplary manipulation training menu screen.

In response to selecting and determining the item "manipulation training" on the function menu screen to instruct switching the mode to the manipulation training mode, the video recording and reproducing apparatus 10 displays a manipulation training menu screen shown in FIG. 2 on the display panel unit 16a of the display device 16.

The manipulation training menu screen shown in FIG. 2 is a screen that allows the user to specify a genre of manipulation training.

Here, as it is also understood from the illustration in FIG. 1, the video recording and reproducing apparatus 10 according to the embodiment has a video recording function (recording function), editing function, and a reproducing function. In the embodiment, it is configured to allow manipulation training for these three functions. The manipulation training menu screen shown in FIG. 2 correspondingly displays a "recording training" button 31a, an "editing training" button 31b, and a "reproducing training" button 31c. Furthermore, a cursor 30 to individually select the buttons is also displayed thereon.

On the manipulation training menu screen shown in FIG. 2, the user manipulates a predetermined key such as a cross key provided on the remote controller 22 to move the cursor 30 for individually selecting the buttons 31a to 31c.

Then, in the state in which a necessary one is selected from among the buttons 31a to 31c with the cursor 30, a predetermined key such as an enter key is then manipulated to specify the genre (recording/editing/reproducing) of manipulation training indicated by the selected one of the buttons 31a to 31c.

Figure 3A:
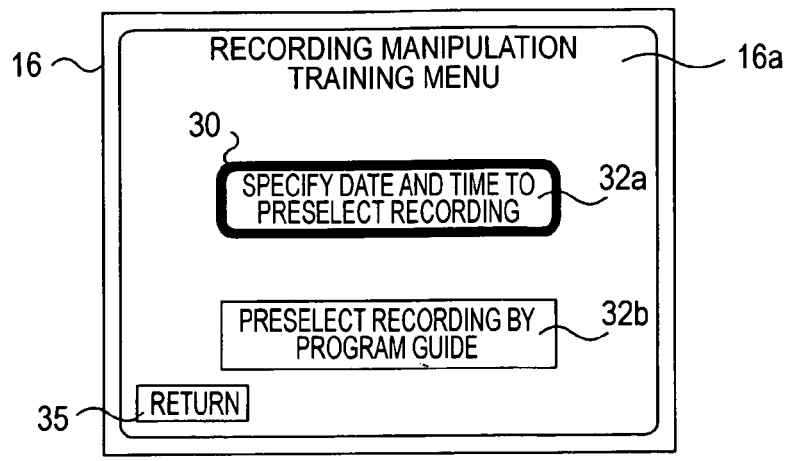
FIGS. 3A to 3C are diagrams depicting an exemplary recording manipulation training menu screen, an exemplary editing manipulation training menu screen, and an exemplary the reproducing manipulation training menu screen.
Figure 3B:
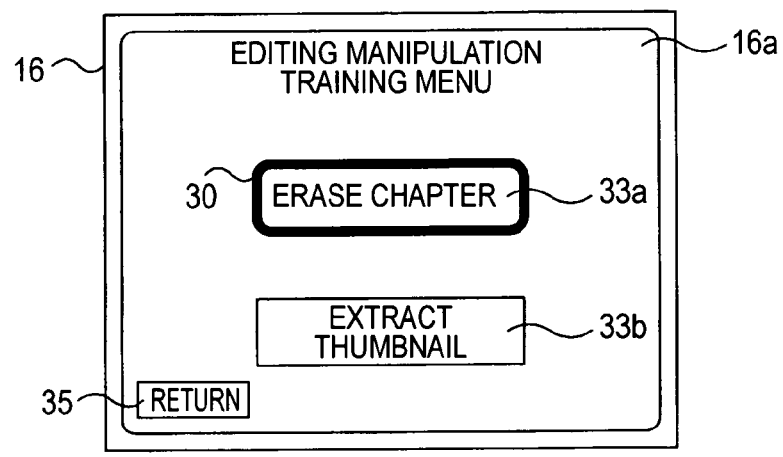
Figure 3C:
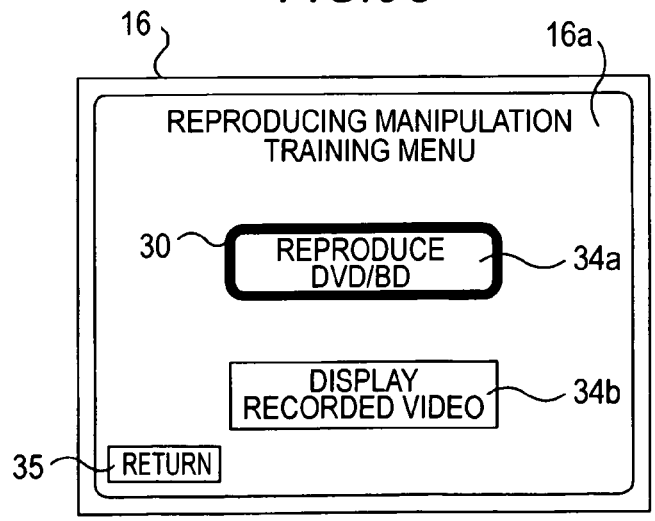

FIGS. 3A to 3C are exemplary screens displayed on the display panel unit 16a in response to specifying the genre on the manipulation training menu screen.

FIG. 3A shows a recording manipulation training menu screen displayed in response to specifying the genre "recording training" on the manipulation training menu screen, FIG. 3B shows an editing manipulation training menu screen displayed in response to specifying the genre "editing training", and FIG. 3C shows a reproducing manipulation training menu screen displayed in response to specifying the genre "reproducing training".

These individual manipulation training menu screens are screens that specify a given manipulation training item from manipulation training items belonging to the specified genre.

More specifically, on the recording manipulation training menu screen shown in FIG. 3A, as manipulation training items, an item "specify a date and time to preselect recording" and an item "preselect recording according to a program guide" are displayed.

In addition, on the editing manipulation training menu screen shown in FIG. 3B, as manipulation training items, an item "erase a chapter" and an item "extract a thumbnail" are displayed, and on the reproducing manipulation training menu screen shown in FIG. 3C, an item "reproduce a DVD/BD" and an item "reproduce recorded video" are displayed.

Here, in the embodiment of the invention, it can be defined that "manipulation training" is conducted in order that a user learns "manipulations necessary to allow the apparatus to perform certain targeted operations". In other words, it can be interpreted that manipulation training is conducted for every targeted operation.

Therefore, from this viewpoint, it can be said that the individual manipulation training items displayed on the individual manipulation training menu screens shown in FIGS. 3A to 3C are in a one-to-one relationship with the targeted operation. More specifically, for example, for the manipulation training item "specify a date and time to preselect recording", it is the manipulation training item in order to perform a single targeted operation that is a recording preselect operation based on the specified date and time information. In addition, for the manipulation training item "preselect recording according to a program guide", it is the manipulation training item in order to perform a single targeted operation that is a recording preselect operation for the broadcast program specified according to a program guide.

From these viewpoints, hereinafter, the individual manipulation training items displayed on the manipulation training menu screens shown in FIGS. 3A to 3C are treated as equal to the targeted operations. More specifically, for example, the items are treated as the targeted operation for the item "specify a date and time to preselect recording" and the targeted operation for the item "preselect recording according to a program guide".

In addition, because of this idea, in other words, it can be said that the individual manipulation training menu screens shown in FIGS. 3A to 3C are screens that allow a user to specify (select) a given targeted operation from the targeted operations belonging to the specified (selected) genre.

In FIGS. 3A to 3C, on each of the manipulation training menu screens, the manipulation training items (targeted operations) are displayed as buttons. In other words, on the recording manipulation training menu screen shown in FIG. 3A, a "specify a date and time to preselect recording" button 32a, and a "preselect recording according to a program guide" button 32b are displayed. In addition, on the editing manipulation training menu screen shown in FIG. 3B, an "erase a chapter" button 33a, and an "extract a thumbnail" button 33b are displayed, and on the reproducing manipulation training menu screen shown in FIG. 3C, a "reproduce a DVD/BD" button 34a, and a "reproduce recorded video" button 34b are displayed.

Furthermore, on each of the manipulation training menu screens shown in FIGS. 3A to 3C, a "return" button 35 is also displayed.

On each of the manipulation training menu screens, also in this case, the user manipulates a predetermined key such as a cross key to move the cursor 30 for selecting the individual buttons. Then, in the state in which a necessary button is selected with the cursor 30, the user manipulates a predetermined key such as the enter key to specify the item indicated by the selected button.

When a certain manipulation training item is specified on the manipulation training menu screens each shown in FIGS. 3A to 3C, the video recording and reproducing apparatus 10 begins to accept the input of a command to allow the user to do manipulation training for the specified item.

In addition, in response to specifying the "return" button 35 on each of the manipulation training menu screens shown in FIGS. 3A to 3C, the display state of the display panel unit 16a is returned to the display state of the manipulation training menu screen shown in FIG. 2.

FIGS. 4 to 9 are diagrams illustrative of the operations performed after the manipulation training item (targeted operation) is specified in the manner as described above.

FIG. 4 is a diagram illustrative of an exemplary operation when the item "specify a date and time to preselect recording" is specified, and FIG. 5 is a diagram illustrative of an exemplary operation when the item "preselect recording according to a program guide" is specified. Hereinafter similarly, FIG. 6 is a diagram illustrative of an exemplary operation for the item "erase a chapter", FIG. 7 is a diagram illustrative of an exemplary operation for the item "extract a thumbnail", FIG. 8 is a diagram illustrative of an exemplary operation for the item "reproduce a DVD/BD", and FIG. 9 is a diagram illustrative of an exemplary operation of "reproduce recorded video".

First, in the embodiment, for conducting manipulation training, targeted goal command information, a training end command, and user input command information as shown in (a), (b), and (c) in FIGS. 4 to 9 are individually used.

The targeted goal command information shown in (a) in FIGS. 4 to 9 is information indicating correct input order of commands necessary to allow the video recording and reproducing apparatus 10 to perform the specified targeted operation.

In addition, information about the training end command shown in (b) in FIGS. 4 to 9 is information used to automatically determine the timing of finishing manipulation training.

In addition, the user input command information shown in (c) in FIGS. 4 to 9 is information generated by accumulating commands inputted by actual user manipulations.

The targeted goal command information and the information about the training end command are information stored in advance in the memory 23, for example. For confirmation, the targeted goal command information and the information about the training end command are information stored as a one-to-one correspondence to the individual targeted operations (the individual manipulation training items).

In addition, the user input command information is information generated by the system controller 19 to store information about inputted commands based on user manipulations in the memory 23, for example.

In addition, in the case of the embodiment, "the command" may correspond only to manipulated input information from the manipulating unit 20 or the light receiving unit 21, or may correspond to selecting and determining manipulations of the button or an icon displayed on the screen of the display panel unit 16a.

For instance, as one example, the input of a "preselect a date and time" button specifying command shown in (c) in FIG. 4 is conducted in such a way that a "preselect a date and time" button displayed on the screen is selected and determined (specified) with the cursor. In addition, the input of a "confirm the preselect" button specifying command is conducted in such a way that a "confirm the preselect" button displayed on the screen is selected and determined with the cursor.

In addition, as understood from this description, when a "so and so" button specifying command is referred, that command is equal to the manipulation to select and determine the corresponding button displayed on the screen with the cursor.

Here, for the details of targeted goal command information and information about the training end command will be described for each of the manipulation training items (each of the targeted operations).

First, for the detail of targeted goal command information in the case of the item "specify a date and time to preselect recording" shown in FIG. 4, as shown in (a) in FIG. 4, the "preselect a date and time" button specifying command, a "set a date and time" button specifying command, and the "confirm the preselect" button specifying command are stored in the same order.

In addition, in this case, for the training end command, as shown in (b) in FIG. 4, it is the "confirm the preselect" button specifying command.

In addition, for the detail of targeted goal command information in the case of the item "preselect recording according to a program guide" shown in FIG. 5, as shown in (a) in FIG. 5, a "display a program guide" button specifying command, a broadcast program in the program guide specifying command, and a "confirm the preselect" button specifying command are stored in the same order. In addition, the "broadcast program in the program guide specifying command" corresponds to selecting and determining an icon of a necessary broadcast program among the icons of broadcast programs displayed in the program guide.

In addition, for the training end command in this case, as shown in (b) in FIG. 5, it is the "confirm the preselect" button specifying command.

In addition, for the detail of targeted goal command information in the case of the item "erase a chapter" shown in FIG. 6, as shown in (a) in FIG. 6, a recorded video title specifying command, an "option" button specifying command, an "edit" button specifying command, an "erase a chapter" button specifying command, a chapter to erase specifying command, a "confirm" button specifying command, and a "YES" button specifying command are stored in the same order. In addition, the "recorded video title specifying command" corresponds to a manipulation to select and determine necessary title information from the list of title information (icons) of recorded video on the screen. In addition, the "chapter to erase specifying command" corresponds to a manipulation to select and determine necessary chapter information from the list of chapter information (icons) on the screen.

In addition, for the training end command in this case, as shown in (b) in FIG. 6, it is the "YES" button specifying command.

In addition, for the detail of targeted goal command information in the case of the item "extract a thumbnail" shown in FIG. 7, as shown in (a) in FIG. 7, a recorded video title specifying command, an "option" button specifying command, an "edit" button specifying command, a "set a thumbnail" button specifying command, a "fast forward" or "rewind" command, and a "confirm" button specifying command are stored in the same order. In addition, the "fast forward" or "rewind" command corresponds to manipulating a fast forward key or a rewind key arranged on the remote controller 22, for example.

In addition, for the training end command in this case, as shown in (b) in FIG. 7, it is the "confirm" button specifying command.

In addition, for the detail of targeted goal command information in the case of the item "reproduce a DVD/BD" shown in FIG. 8, as shown in (a) in FIG. 8, only a "reproduce a DVD/BD" button specifying command is stored.

In addition, for the training end command in this case, as shown in (b) in FIG. 8, it is the "reproduce a DVD/BD" button specifying command.

In addition, for the detail of targeted goal command information in the case of "reproduce recorded video" shown in FIG. 9, as shown in (a) in FIG. 9, only a "reproduce recorded video" button specifying command is stored.

In addition, for the training end command in this case, as shown in (b) in FIG. 9, it is the "reproduce recorded video" button specifying command.

Here, in conducting manipulation training, after specifying the targeted operation (manipulation training item), the user uses various buttons displayed on the screen to freely make manipulations to perform the targeted operation.

As described above, in response to manipulations made by the user, commands are in turn inputted to the video recording and reproducing apparatus 10. The system controller 19 stores the commands inputted after the targeted operation is specified as described above one after another in the memory 23, whereby the system controller 19 generates user input command information.

In addition, the video recording and reproducing apparatus 10 according to the embodiment is configured to conduct a determination process of automatically finishing manipulation training, based on the command inputted after the targeted operation is specified as described above and on information about the training end command stored in advance.

More specifically, the system controller 19 sequentially determines whether information about the command inputted after the targeted operation is specified is matched with information about the training end command stored in advance in the memory 23, and determines whether the items of information about the individual commands are matched.

As the result of these determinations, when the individual commands are matched, manipulation training is finished. More specifically, the acceptance of the input of the command is finished, and the process goes to the next process.

On the other hand, when the individual commands are not matched, the acceptance of the input of the command is continuously conducted to keep on manipulation training.

In addition, as understood from the descriptions above, in the case of the embodiment, as the training end command, it is supposed to store the last command in the targeted goal command information.

Here, as understood from this description, in order to automatically finish manipulation training, such a scheme may be possible that it is sequentially determined whether the inputted command is matched with the last command in the targeted goal command information. Therefore, it is unnecessary to separately store information about the training end command as information different from the targeted goal command information.

As the result of the determination above, after the individual commands are matched and the acceptance of the input of the command is finished, the user is notified of the compared result of user input command information with targeted goal command information.

In the case of this example, for the notice of the compared result, the user is notified whether a correct manipulation is made, and the user is notified of an unmatched command when a correct manipulation is not made. Furthermore, when a correct manipulation is not made, in addition to the notice of the unmatched command, the user is also notified of information about the correct input order of the unmatched command.

More specifically, for example, when the detail of user input command information is matched with the detail of targeted goal command information, such message data that "a correct manipulation has been made" is displayed on the display panel unit 16*a* to notify the user that a correct manipulation has been made for performing the targeted operation.

Here, an operation of presenting the compared result of user input command information with targeted goal command information will be described as a specific example is taken below.

First, the case will be described in which the item "specify a date and time to preselect recording" shown in FIG. 4 is specified.

In this case, the correct input order of the commands shown in (a) in FIG. 4 is the order of inputting the "preselect a date and time" button specifying command, the "set a date and time" button specifying command, and then the "confirm the preselect" button specifying command. However, depending on a user, as shown in (c) in FIG. 4, inputs are made in the following order: the "preselect a date and time" button specifying command, a "set a BD as a recording destination" button specifying command, and the "confirm the preselect" button specifying command.

In targeted goal command information, the "preselect a date and time" button specifying command is inputted and then the "set a date and time" button specifying command is inputted, whereas in user input command information, the "preselect a date and time" button specifying command is stored and then the "set a BD as a recording destination" button specifying command is stored.

Therefore in this case, such message data is displayed on the display panel unit 16*a* that you have made a manipulation "set BD as a recording destination" after a manipulation "preselect the date and time" and correctly, you have to make a manipulation "set the date and time" after a manipulation "preselect the date and time". The user is notified of the unmatched command with a correct manipulation, and also the correct input order of the unmatched command.

In addition, in the case of the item "preselect recording according to a program guide" shown in FIG. 5, the correct input order of the commands is the order of inputting the "display a program guide" button specifying command, the broadcast program in the program guide specifying command, and then the "confirm the preselect" button specifying command as shown in (a) in FIG. 5. Depending on a user, as shown in (c) in FIG. 5, inputs are made in the following order: the "display a program guide" button specifying command, the broadcast program in the program guide specifying command, and the "confirm the preselect" button specifying command.

In this case, because user input command information is matched with the detail of targeted goal command information, such message data that "a correct manipulation has been made" is displayed on the display panel unit 16a, whereby the user is notified that a correct manipulation has been made for performing the targeted operation.

In addition, in the case of the item "erase a chapter" shown in FIG. 6, the correct input order of the commands is the order of inputting the recorded video title specifying command, the "option" button specifying command, the "edit" button specifying command, the "erase a chapter" button specifying command, the chapter to erase specifying command, the "confirm" button specifying command, and then the "YES" button specifying command as shown in (a) in FIG. 6. Depending on a user, as shown in (c) in FIG. 6, the commands are inputted in the following order: the recorded video title specifying command, the "option" button specifying command, the "edit" button specifying command, the "erase a chapter" button specifying command, the chapter to erase specifying command, the "confirm" button specifying command, and the "YES" button specifying command.

Also in this case, because user input command information is matched with the detail of targeted goal command information, the user is notified that a correct manipulation has been made for performing the targeted operation.

In addition, in the case of the item "extract a thumbnail" shown in FIG. 7, the correct input order of the commands is the order of inputting the recorded video title specifying command, the "option" button specifying command, the "edit" button specifying command, the "set a thumbnail" button specifying command, the "fast forward" or "rewind" command, and then the "confirm" button specifying command as shown in (a) in FIG. 7.

However, depending on a user, as shown in (c) in FIG. 7, inputs are made in the following order: the recorded video title specifying command, the "option" button specifying command, the "edit" button specifying command, the "set a thumbnail" button specifying command, and the "confirm" button specifying command.

In this case, after the "set a thumbnail" button specifying command, correctly, the inputs of the "fast forward" or "rewind" command and the "confirm" button specifying command have to be made. However, depending on a user, the "set a thumbnail" button specifying command and then the "confirm" button specifying command are inputted.

Therefore in this case, for example, such message data is displayed on the display panel unit 16a that you have made a manipulation "confirm" after a manipulation "set the thumbnail" and correctly, after a manipulation "set the thumbnail", you have to make a manipulation "input the fast forward or rewind button" and then a manipulation "confirm". The user is notified of the unmatched command and the correct input order of the unmatched command.

In addition, in the case of the item "reproduce a DVD/BD" shown in FIG. 8, the correct input order of the command (in this case, a single command only), the "reproduce a DVD/BD" button specifying command shown in (a) in FIG. 8, is matched with the command actually inputted by the user, the "reproduce a DVD/BD" button specifying command shown in (c) in FIG. 8.

Therefore in this case, the user is notified that a correct manipulation has been made for performing the targeted operation.

Similarly, also in the case of the item "reproduce recorded video" shown in FIG. 9, the correct command, the "reproduce recorded video" button specifying command shown in (a) in FIG. 9, is matched with the command actually inputted by the user, the "reproduce recorded video" button specifying command shown in (c) in FIG. 9. Therefore also in this case, the user is notified that a correct manipulation has been made for performing the targeted operation.

As discussed above, the video recording and reproducing apparatus 10 according to the embodiment is configured in which the commands inputted based on user manipulations are stored to generate user input command information and the user is notified of the compared result of the user input command information with targeted goal command information stored in advance. Accordingly, the user can be notified of the compared result of the manipulation actually made by the user with the manipulation necessary to perform the targeted operation, and because of this scheme, manipulation training can be conducted to teach the steps of correct manipulations to the user to perform the targeted operation.

Through manipulation training, the user can readily learn the steps of correct manipulations for performing the targeted operation without reading a manual, and consequently, even though the user has to learn complicated manipulations, the burdens of the user can be reduced significantly.

In addition, according to the video recording and reproducing apparatus 10 of the embodiment, the user is allowed to do manipulation training not only for a single targeted operation but also for a plurality of targeted operations.

In addition, in the embodiment, manipulation training is automatically finished in response to inputting the command matched with information about the training end command. This eliminates the necessity for the user to make a manipulation to instruct the timing of finishing manipulation training, and also on this point, the burdens of the user can be reduced.

Process Steps of the Operations

The specific process steps of implementing the operations of the embodiment described above will be described with reference to flowcharts in FIGS. 10 and 11.

Figure 10:
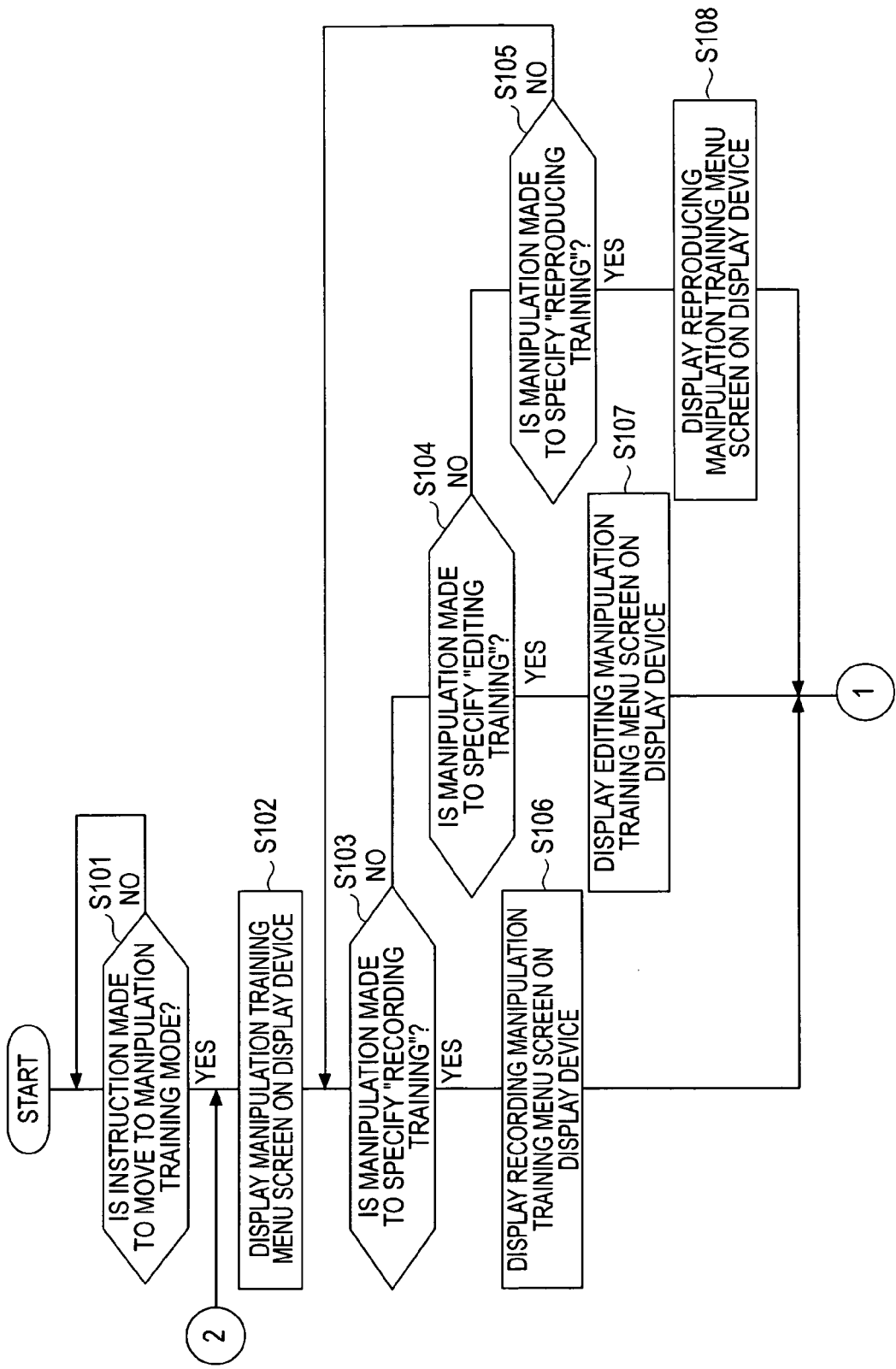
FIG. 10 is a flowchart depicting the process steps performed to implement the operation of an embodiment.
Figure 11:
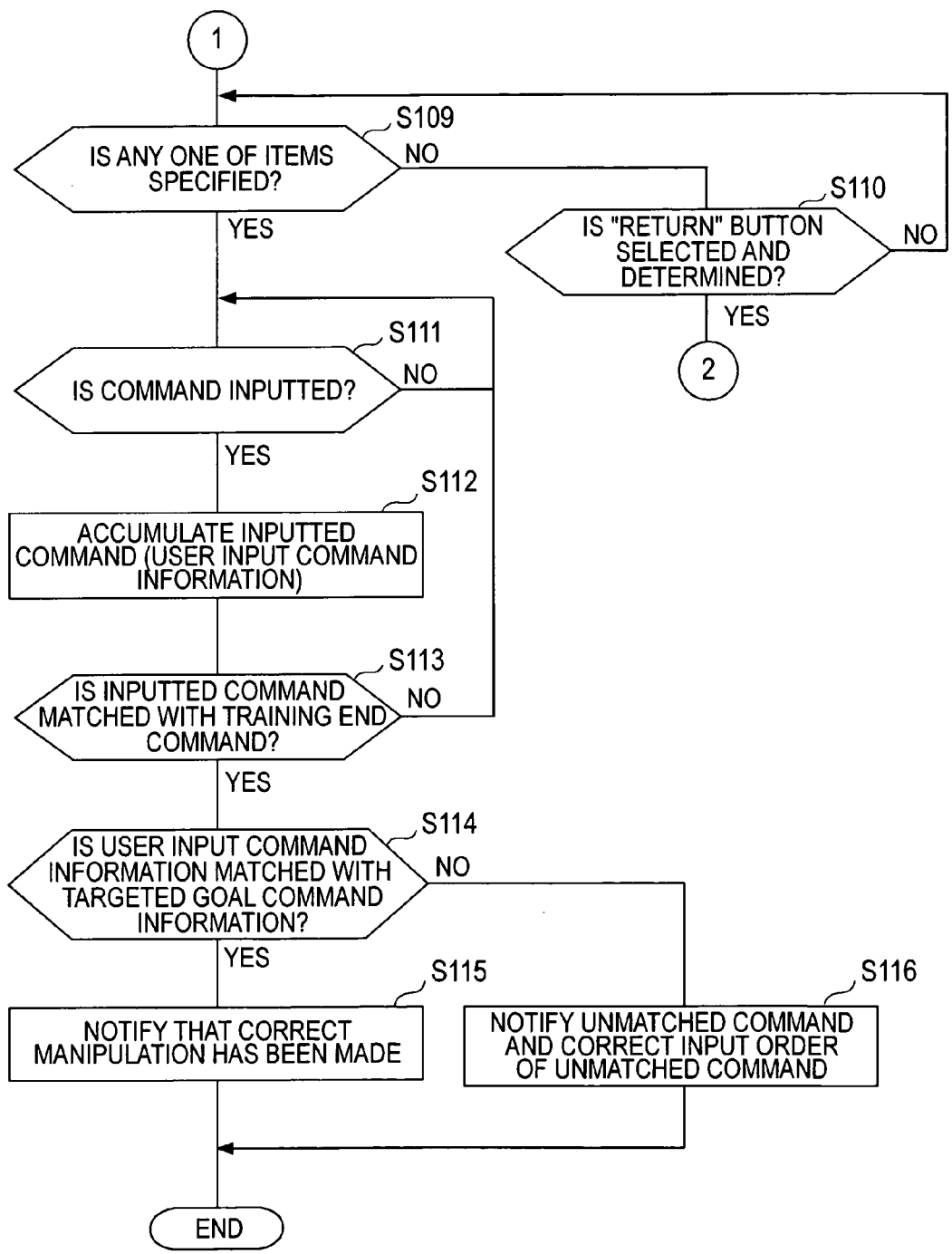
FIG. 11 is a flowchart depicting the process steps performed to implement the operation of an embodiment.

In addition, in the flowcharts in FIGS. 10 and 11, the specific process steps of implementing the operations of the embodiment are shown as the process steps performed by the system controller 19 shown in FIG. 1 based on the manipulation training program 23a stored in the memory 23.

First, in FIG. 10, in Step S101, the system controller 19 performs the process of waiting until an instruction is made to switch to the manipulation training mode. Here, according to the descriptions above, switching to the manipulation training mode in this case is conducted in response to specifying the function item "manipulation training" through the function menu screen. Therefore, in Step S101, the system controller 19 is configured to wait until a manipulation is made to specify the item "manipulation training" in the display state of the function menu screen.

Then, if a manipulation is made to specify the item "manipulation training" and an instruction is made to switch to the manipulation training mode, in Step S102, the system controller 19 performs the process of displaying the manipulation training menu screen on the display device 16. In other words, display screen data as the manipulation training menu screen shown in FIG. 2 is supplied to the video signal processing unit 15, and video data corresponding to the display screen data is supplied to the display device 16 through the video output terminal Tout. Thus, the manipulation training menu screen is displayed on the display panel unit 16a of the display device 16.

Depending on the subsequent Steps S103, S104, and S105, a process sequence is generated to wait until a manipulation is made to specify any one of the manipulation training items (targeted operations) "recording training", "editing training", and "reproducing training" displayed on the manipulation training menu screen. In other words, in Step S103, it is determined whether a manipulation is made to select and determine the "recording training" button 31a. If it is negative because a manipulation is not made to select and determine the "recording training" button 31a, in Step S104, it is determined whether a manipulation is made to select and determine the "editing training" button 31b. Then, in Step S104, if it is negative because a manipulation is not made to select and determine the "editing training" button 31b, the process step goes to Step S105, and then it is determined whether a manipulation is made to select and determine the "reproducing training" button 31c. If it is negative because a manipulation is not made to select and determine the "reproducing training" button 31c, the process step returns to Step S103.

As described above, such a process is formed: the process of waiting until a manipulation is made to specify any one of the manipulation training items (targeted operations) "recording training", "editing training", and "reproducing training" displayed on the manipulation training menu screen shown in FIG. 2.

Then, in Step S103, if a manipulation is made to select and determine the "recording training" button 31a and it is positive because a manipulation is made to specify the item "recording training", in Step S106, the system controller 19 performs the process of displaying the recording manipulation training menu screen on the display device 16. In other words, display screen data as the recording manipulation training menu screen shown in FIG. 3A is supplied to the video signal processing unit 15, and video data corresponding to the display screen data is supplied to the display device 16 through the video output terminal Tout.

The process in Step S106 is performed, and then the process step goes to Step S109 shown in FIG. 11.

In addition, in Step S104, if a manipulation is made to select and determine the "editing training" button 31b and it is positive because a manipulation is made to specify the item "editing training", in Step S107, the system controller 19 performs the process of displaying the editing manipulation training menu screen on the display device 16. After that, the process step goes to Step S109 shown in FIG. 11.

In addition, in Step S105, if a manipulation is made to select and determine the "reproducing training" button 31c and it is positive because a manipulation is made to specify the item "reproducing training", in Step S108, the system controller 19 performs the process of displaying the reproducing manipulation training menu screen on the display device 16. After that, the process step goes to Step S109 shown in FIG. 11.

In FIG. 11, in Step S109, it is determined whether any item is specified.

More specifically, it is determined whether a manipulation is made to specify any one of the manipulation training items on the manipulation training menu screen (the recording manipulation training menu screen, the editing manipulation training menu screen, or the reproducing manipulation training menu screen) displayed in the previous Step S106, S107, or S108. More specifically, it is determined whether a manipulation is made to select and determine any one of the buttons for the manipulation training items on the screen.

In Step S109, if it is negative because a manipulation is not made to specify any one of the manipulation training items (that is, any one of the targeted operations), the process step goes to Step S110, and it is determined whether the "return" button is selected and determined. More specifically, it is determined whether a manipulation is made to select and determine the "return" button 35 shown in FIGS. 3A to 3C.

In Step S110, if it is positive because a manipulation is made to select and determine the "return" button, the process step returns to Step S102 shown in FIG. 10. Thus, in response to specifying the item "return", the display on the screen returns to the display of the manipulation training menu screen shown in FIG. 2.

In addition, in Step S110, if it is negative because a manipulation is not made to select and determine the "return" button, the process step returns to Step S109.

Then, in Step S109, if it is positive because a manipulation is made to specify any one of the manipulation training items (targeted operations), in Step S111, the system controller 19 waits for the input of a command. Then, if a command is inputted, in Step S112, the system controller 19 performs the process of accumulating the inputted command. More specifically, the system controller 19 stores information about the inputted command in the memory 23, for example. The accumulating process in Step S112 is sequentially conducted for each of the inputs of the commands, whereby user input command information is generated.

Subsequently, in Step S113, it is determined whether the inputted command is matched with the training end command. More specifically, it is determined whether the command inputted in Step S111 is matched with the training end command for the manipulation training item specified in Step S109 among the training end commands for the individual manipulation training items stored in advance in the memory 23.

In Step S113, if it is negative because the inputted command is not matched with the training end command, the process step returns to Step S111. In other words, because this case is not in the state in which manipulation training has to be finished, the state of accepting the input of a command is continuously maintained.

In addition, in Step S113, if it is positive because the inputted command is matched with the training end command, the process step goes to Step S114, and it is determined whether user input command information is matched with targeted goal command information.

In other words, it is determined whether the detail of user input command information generated in the course of the accumulating process in Step S112 is matched with the detail of targeted goal command information about the manipulation training item specified in Step S109 among the items of targeted goal command information about the individual manipulation training items stored in advance in the memory 23.

In Step S114, if it is positive because the details of the individual items of command information are matched, the process step goes to Step S115, and the system controller 19 performs the process of notifying that a correct manipulation has been made. In other words, as described above, for example, such message data that "a correct manipulation has been made" (image data) is displayed on the display device 16, whereby the user is notified that a correct manipulation has been made for performing the targeted operation.

In addition, in Step S114, if it is negative because the detail of command information is not matched, in Step S116, the system controller 19 performs the process of notifying the unmatched command and the correct input order of the unmatched command.

In addition, the detail of specific message data for notifying the unmatched command and the correct input order of the unmatched command may be similar to the detail described above.

As exemplified above, in the case of this example, it is configured in which in notifying the unmatched command, it is also notified what command is inputted before the unmatched command is inputted, and this facilitates more readily identifying the unmatched command.

The process in Step S116 or S115 is performed, and then the process sequence shown in FIGS. 10 and 11 is ended.

Modification

As discussed above, the embodiment of the invention is described. However, the embodiment of the invention should not be limited to the specific examples described so far.

Here, although specific explanations are not given, when a command is inputted in conducting manipulation training, practically, the system controller 19 performs the computing and control processes in accordance with an inputted command, whereby the operation in accordance with the inputted command is performed in the video recording and reproducing apparatus 10. For example, in the case of recording manipulation training, in response to inputting a series of commands for performing the targeted operation for the item "specify a date and time to preselect recording", a video content as a broadcast program preselected for recording is actually recorded on the HDD 17. In addition, in the case of edit manipulation training, a video content edited in accordance with the inputted command in manipulation training is recorded (overwritten) on the HDD 17.

However, based on these descriptions, video contents recorded as practice in manipulation training and normal video contents recorded in normal use other than in manipulation training are mixed on the HDD 17. Particularly, it is likely to cause such a problem that when edit manipulation training is performed, the edited detail is reflected in a normal video content despite performing edit manipulation as practice.

Figure 12:
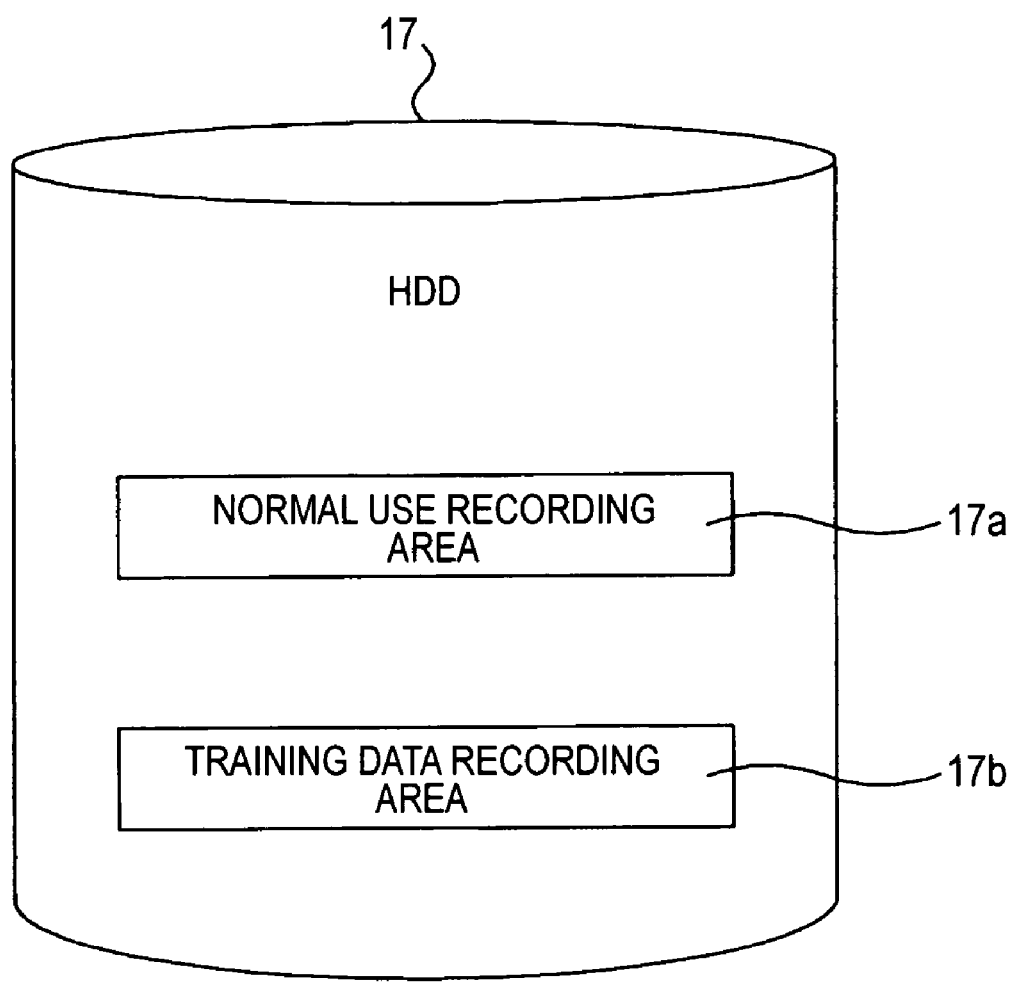
FIG. 12 is a diagram illustrative of a modification.

Then, the video content recorded in accordance with the input of the command in manipulation training may be managed in such a way that the video content is distinguished as a training content from the normal contents. FIG. 12 shows a conceptual diagram depicting this. As shown in FIG. 12, a HDD 17 in this case has recording areas: a normal use recording area 17a as a recording area for recorded data in normal use, and a training data recording area 17b as a recording area for data to be recorded in accordance with the input of the command in manipulation training.

In order to implement such a management form, it may be configured in which the system controller 19 generates management information for managing data in such a way that data is at least indicated to be data in the training data recording area 17b. For data recorded on the HDD 17 in the manipulation training mode, the system controller 19 adds identification information about the data (for example, information about the file name of its recorded file, and information about its recorded address) to the management information. Thus, data recorded in training can be distinguished and recorded in the training area.

Such area separation is conducted to effectively avoid possible confusion of the user when data in normal use and data in manipulation training are mixed and recorded.

In addition, in the discussions so far, as the notice of the compared result of user input command information with targeted goal command information, the user is notified that a correct manipulation has been made when both items of command information are matched, whereas the user is notified of the unmatched command and the correct input order of the unmatched command when both items of command information are not matched. However, the detail of the notice of the compared result should not be limited thereto. For example, it may be possible to simply compare and display the details of both items of command information as they are.

In addition, in the discussions so far, six items depicted in FIGS. 3A to 3C are shown as examples of the manipulation training items (targeted operations). However, in the embodiment of the invention, the targeted operations should not be limited thereto. Manipulation training may be conducted for other targeted operations.

In addition, in the discussions so far, manipulation training is automatically finished (that is, the acceptance of command input as training is automatically finished) in response to inputting the command matched with the predetermined training end command. However, it may be possible that the timing of finishing manipulation training is instructed by a user manipulation to manually finish manipulation training.

In this case, for example, it is sufficient that a "training end" button is displayed all the time on the screen shown in the manipulation training mode and manipulation training is finished in response to making a manipulation to select and determine the "training end" button.

For automatically finishing manipulation training, in addition to using the training end command, for example, it may be possible to provide a time limit from the beginning of training to automatically finish manipulation training. In other words, for example, it may be a scheme that measuring time is started in response to specifying the targeted operation and manipulation training is automatically finished at a point in time at which a predetermined time period has elapsed.

In addition, in the discussions so far, the case is taken as an example in which the compared result is notified by image display using the display screen. However, for example, the compared result may be notified by other schemes such as sound output.

In addition, in the discussions so far, the case is taken as an example in which the embodiment of the invention is adapted to the video recording and reproducing apparatus that records and reproduces broadcast programs in television broadcasting. However, the embodiment of the invention can be preferably and widely adapted to electronic appliances such as a television set, a personal computer, and a radio receiver, to which operations are instructed through user manipulations.

It should be understood by those skilled in the art that various modifications, combinations, sub-combinations, and alterations may occur depending on design requirements and other factors insofar as they are within the scope of the appended claims or the equivalents thereof.

What is claimed is:

1. A training apparatus comprising:
   a storing means for storing therein targeted goal command information indicating correct input order of commands necessary to perform a targeted operation for each of individual targeted operations;
   recording means for recording inputted data on a recording medium; and
   a control means,
   wherein the control means conducts
   a targeted operation selecting process of selecting one targeted operation from the individual targeted operations based on a user manipulation;
   a user input command information generation process of generating user input command information by accumulating a command inputted based on a user manipulation; and
   a notification control process of conducting control so as to notify a compared result of the targeted goal command information about a targeted operation selected in the targeted operation selecting process with user input command information generated in the user input command information generation process, wherein at least one targeted operation in the targeted operations is an operation related to editing data recorded on the recording medium.

2. The training apparatus according to claim 1, wherein the control means conducts a manipulation training process including the targeted operation selecting process, the user input command information generation process, and the notification control process in response to making a predetermined manipulation to instruct switching to a manipulation training mode.

3. A training apparatus comprising:

a storing means for storing therein targeted goal command information indicating correct input order of commands necessary to perform a targeted operation for each of individual targeted operations;

a recording means for recording inputted data on a necessary recording medium; and a control means, wherein the control means conducts a targeted operation selecting process of selecting one targeted operation from the individual targeted operations based on a user manipulation;

a user input command information generation process of generating user input command information by accumulating a command inputted based on a user manipulation;

a notification control process of conducting control so as to notify a compared result of the targeted goal command information about a targeted operation selected in the targeted operation selecting process with user input command information generated in the user input command information generation process, a manipulation training process including the targeted operation selecting process, the user input command information generation process, and the notification control process in response to making a predetermined manipulation to instruct switching to a manipulation training mode, wherein at least one targeted operation in the targeted operations is an operation related to recording inputted data by recording means, and wherein at least one targeted operation in the targeted operations is an operation related to editing data recorded on the recording medium.

4. The training apparatus according to claim 3, further comprising a reproducing means for reproducing data recorded on the recording medium, wherein at least one targeted operation in the targeted operations is an operation related to reproducing data recorded on the recording medium.

5. The training apparatus according to claim 4, wherein the control means further conducts a management information generation process of generating data management information for managing data such that data to be recorded on the recording medium in response to inputting a command after switching to the training mode is separated from other data recorded on the recording medium.

6. A training method of a training apparatus stored with targeted goal command information indicating correct input order of commands necessary to perform a targeted operation for each of individual targeted operations, the method comprising the steps of:

recording inputted data on a recording medium;

selecting one targeted operation from the individual targeted operations based on a user manipulation;

generating user input command information by accumulating a command inputted based on a user manipulation; and controlling notification so as to notify a compared result of user input command information generated in the step of generating user input command information with targeted goal command information about a targeted operation selected in the step of selecting a targeted operation, wherein at least one targeted operation in the targeted operations is an operation related to editing data recorded on the recording medium.

7. A training apparatus comprising:

a storing unit configured to store therein targeted goal command information indicating correct input order of commands necessary to perform a targeted operation for each of individual targeted operations;

a recording unit configured to record inputted data on a recording medium; and a control unit, wherein the control unit conducts a targeted operation selecting process of selecting one targeted operation from the individual targeted operations based on a user manipulation;

a user input command information generation process of generating user input command information by accumulating a command inputted based on a user manipulation; and a notification control process of conducting control so as to notify a compared result of the targeted goal command information about a targeted operation selected in the targeted operation selecting process with user input command information generated in the user input command information generation process, wherein at least one targeted operation in the targeted operations is an operation related to editing data recorded on the recording medium.

* * * * *